United States Patent
Limaiem et al.

(10) Patent No.: US 6,477,517 B1
(45) Date of Patent: Nov. 5, 2002

(54) METHOD OF KNOWLEDGE-BASED ENGINEERING DESIGN OF AN INSTRUMENT PANEL

(75) Inventors: Anis Limaiem, Windsor (CA); Albert James Dapoz, Sterling Heights, MI (US); Basil Taha Alsayyed, Windsor (CA); Daniel Cornelius Bach, Belleville, MI (US); Kousik Chakrabarti, Westland, MI (US); Patrick Lee Vallad, Britton, MI (US); Richard King-Hong Leung, Novi, MI (US); Ta-chuan Sun, Southgate, MI (US); Yung-Sen Steven Sheng, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/488,701

(22) Filed: Jan. 20, 2000

(51) Int. Cl.[7] .............................................. G06F 17/00

(52) U.S. Cl. ........................................... 706/45; 706/46

(58) Field of Search ..................................... 706/45, 46

(56) References Cited

U.S. PATENT DOCUMENTS

| | | | |
|---|---|---|---|
| 4,912,657 A | 3/1990 | Saxon et al. ................. | 345/853 |
| 5,070,534 A | 12/1991 | Lascelles et al. ........... | 345/764 |
| 5,111,413 A | 5/1992 | Lazansky et al. ............. | 703/14 |
| 5,197,120 A | 3/1993 | Saxton et al. ............... | 345/661 |
| 5,293,479 A | 3/1994 | Quintero et al. ............ | 345/841 |
| 5,799,293 A | 8/1998 | Kaepp ......................... | 706/45 |
| 6,113,644 A * | 9/2000 | Weber et al. ................... | 703/8 |
| 6,209,794 B1 * | 4/2001 | Webster et al. ............... | 236/94 |

OTHER PUBLICATIONS

SAE Standard, "Devices For Use In Defining And Measuring Vehicle Seating Accomodation–SAE J826", Jun, 1992.
SAE Recommended Practice, "Motor Vehicle Drivers' Eye Locations–SAE J941", Jun. 1992.
SAE Recommended Practice, "Passenger Car Windshield Defrosting Systems–SAE J902", Apr. 1993.
SAE Recommended Practice, "Windshield Wiper Systems–Trucks, Buses, And Multipurpose Vehicles–SAE J198", Jun. 1993.
SAE Recommended Practice, "Motor Vehicle Dimensions –SAE J1100", Jun. 1993.
SAE Recommended Practice, "Describing And Measuring The Driver's Field Of View–SAE J1050", Aug. 1994.
SAE Recommended Practice, "Passenger Car Windshield Wiper Systems–SAE J903c", Nov. 1973.
SAE Recommended Practice, "Motor Vehicle Driver And Passenger Head Position–SAE J1052", May 1987.
SAE Recommended Practice, "Driver Hand Control Reach –SAE J287", Jun. 1988.
SAE Recommended Practice, "Passenger Car Glazing Shade Bands–SAE J100", Mar. 1988.

(List continued on next page.)

Primary Examiner—George B. Davis
(74) Attorney, Agent, or Firm—Larry I. Shelton

(57) ABSTRACT

A method of knowledge-based engineering design of an instrument panel for a vehicle includes the steps of defining a parameter of the instrument panel using a knowledge-based engineering library stored in a memory of a computer system, generating a model of the instrument panel based on the parameter and analyzing the model of the instrument panel. The method also includes the steps of comparing a result of the analysis of the model of the instrument panel to a predetermined criteria from the knowledge-based engineering library, and varying the parameter so that the model of the instrument panel meets the predetermined criteria.

23 Claims, 11 Drawing Sheets

OTHER PUBLICATIONS

SAE Recommended Practice, "Accommodation Tool Reference Point–SAE J1516", Mar. 1990.

SAE Recommended Practice, "Driver Selected Seat Position–SAE J1517", Mar. 1990.

SAE Recommended Practice, "Truck Driver Shin–Knee Position For Clutch And Accelerator–SAE J1521", Mar. 1990.

SAE Recommended Practice, "Truck Driver Stomach Position–SAE J1522", Mar. 1990.

* cited by examiner

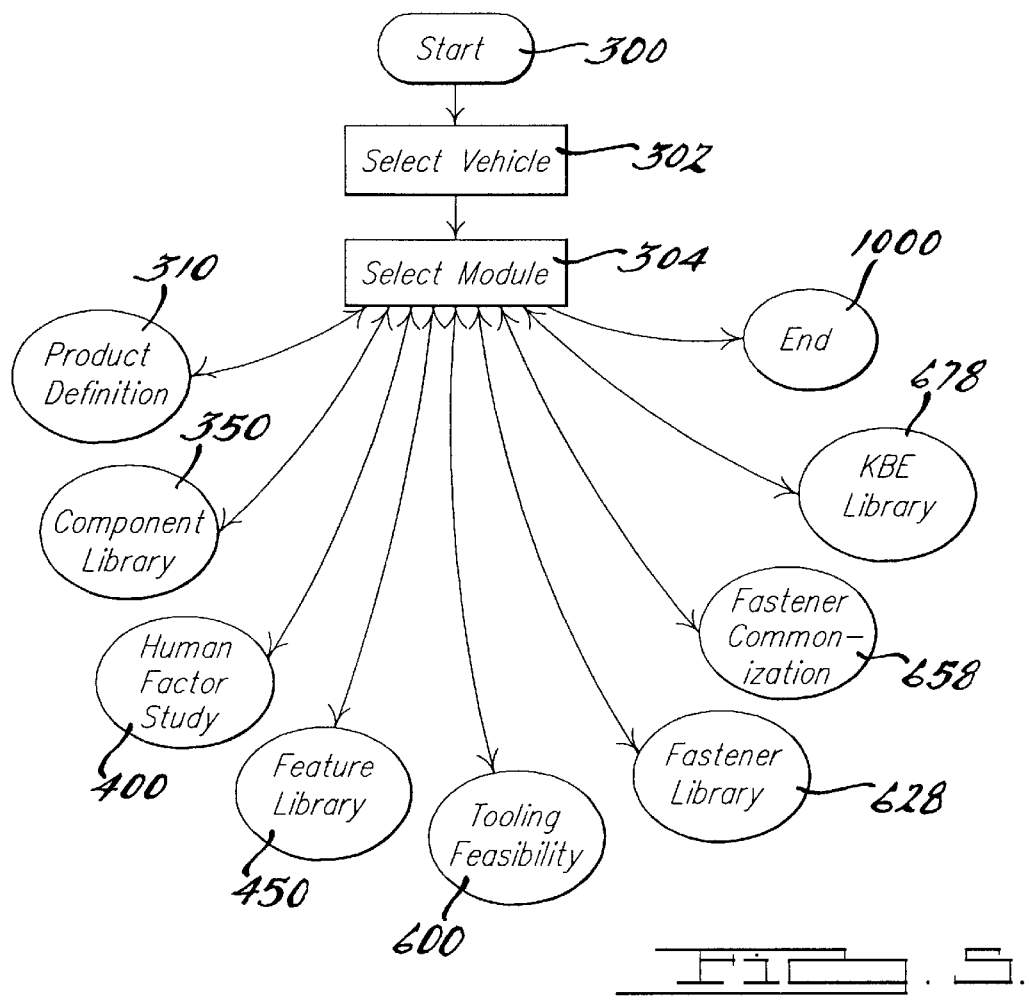
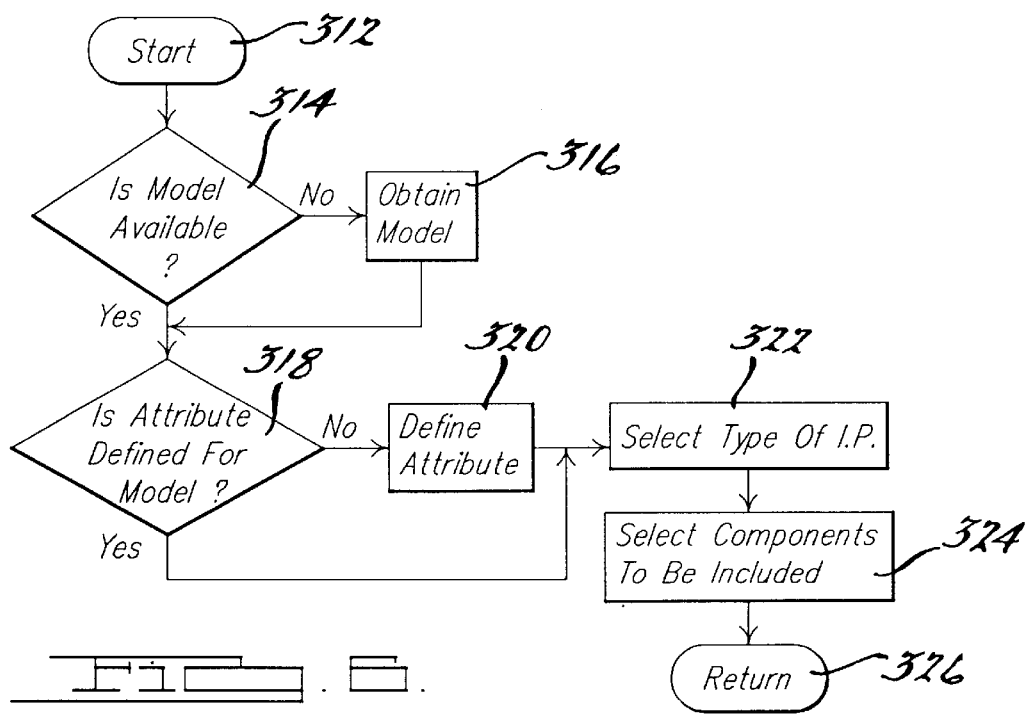

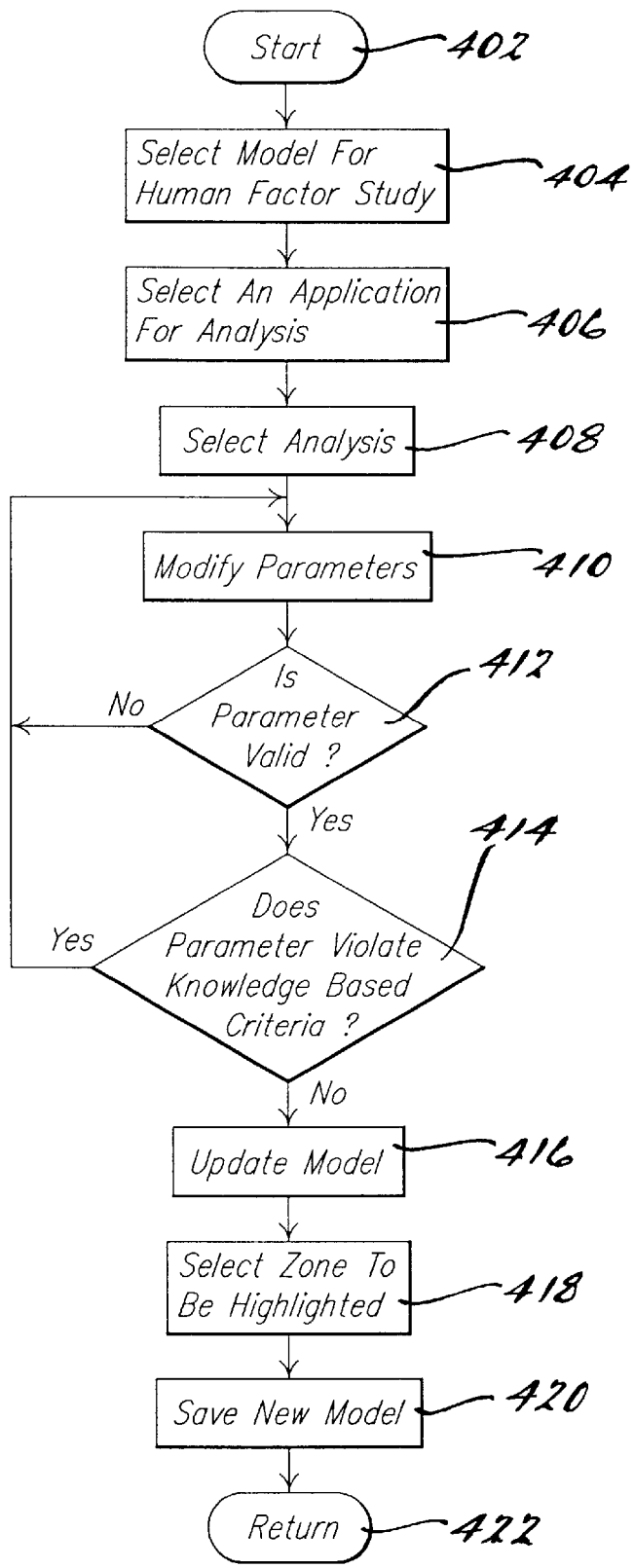

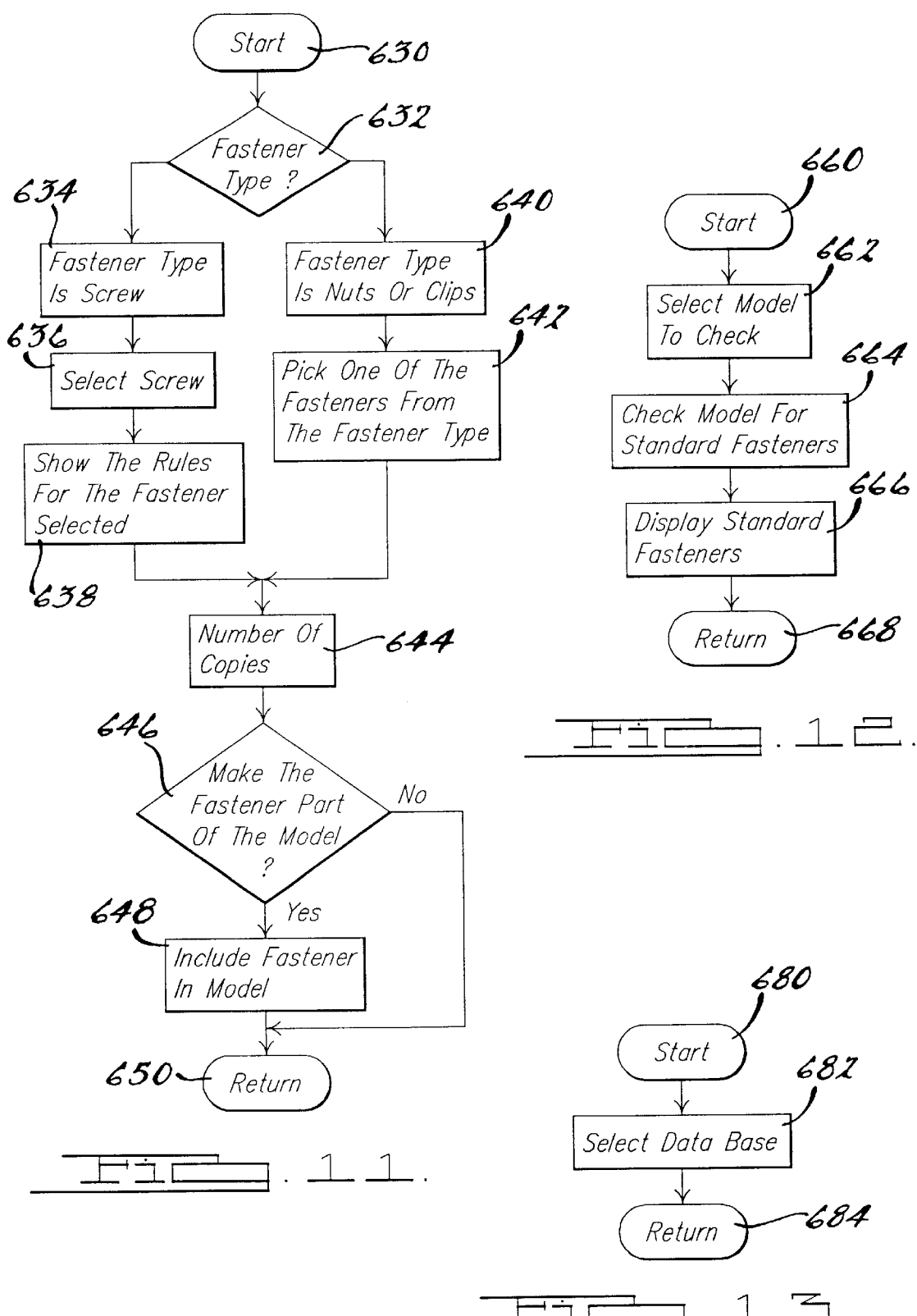

METHOD OF KNOWLEDGE-BASED ENGINEERING DESIGN OF AN INSTRUMENT PANEL

BACKGROUND OF THE INVENTION

1. Field of the Invention

The present invention relates generally to computer-aided design of vehicles and, more specifically, to a method of knowledge-based engineering design of an instrument panel for a vehicle.

2. Description of the Related Art

Vehicle design, and in particular automotive vehicle design, has advanced to a state in which computer-aided design techniques are frequently incorporated in the development of a new vehicle. Computer-aided design is especially beneficial in the design and packaging of the various systems incorporated within a vehicle, to maximize design and functional capabilities of the vehicle systems. One example of a vehicle system is an instrument panel. The instrument panel is positioned between a side structure of the vehicle to provide structural reinforcement for a vehicle body. The instrument panel also provides an attachment surface for various vehicle components such as an audio component, an inflatable restraint system, or a heating, ventilation and air conditioning (HVAC) system.

One aspect of the design task for a vehicle system, such as the instrument panel, is to ensure that the design of the vehicle system is spatially compatible with a particular environment. Another aspect of the design task is to ensure that the design complies with predetermined functional criteria, including performance and durability requirements. In the past, various methods have been utilized to determine whether a proposed design meets such predetermined criteria. For example, a proposed design may be analyzed in two dimensions, which requires many iterations of a drawing. A three-dimensional model may also be constructed to obtain a better perspective of the design. The three-dimensional model may further be subjected to testing to determine whether it complies with performance and durability criteria. This design method is time consuming and expensive.

It is also known that knowledge-based design methods are being utilized in designing a vehicle system. The knowledge-based design method provides advice to a user based on knowledge, guidelines and lessons learned from previous designs, and engineering and manufacturing experience. Advantageously, a knowledge-based design technique maximizes the incorporation of knowledge on the design of a vehicle system while developing a new vehicle system in a minimal period of time. An example of a knowledge-based design technique is disclosed in U.S. Pat. No. 5,799,293 to Kaepp, entitled "Method For Optimizing The Design Of A Product Using Knowledge Based Engineering Techniques", the disclosure of which is hereby incorporated by reference.

It is also known to use a computer-aided design technique to design a vehicle system. An example of a computer aided design technique is disclosed in U.S. patent application, Ser. No. 08/984,806, entitled "Method and System For Vehicle Design Using Occupant Reach Zones", the disclosure of which is also hereby incorporated by reference.

It is further known to use a parametric design technique to design a vehicle system. An example of a parametric design technique is disclosed in U.S. patent application, Ser. No. 09/385,739, entitled "Method of Parametric Design of an Instrument Panel Support Structure", the disclosure of which is hereby incorporated by reference.

While the above design techniques work they do not integrate the available knowledge-based engineering design and analysis tools into a single user interface for the design of a complex system. Therefore, there is a need in the art to provide a method for designing an instrument panel for a vehicle using an integrated knowledge based engineering design technique, to reduce development time, and cost.

SUMMARY OF THE INVENTION

Accordingly, the present invention is a method of knowledge-based engineering design of an instrument panel for a vehicle. The method includes the steps of defining a parameter of the instrument panel using a knowledge-based engineering library stored in a memory of a computer system, generating a model of the instrument panel based on the parameter and analyzing the model of the instrument panel. The method also includes the steps of comparing a result of the analysis of the model of the instrument panel to a predetermined criteria from the knowledge-based engineering library, and varying the parameter so that the model of the instrument panel meets the predetermined criteria.

One advantage of the present invention is that an improved method of knowledge-based engineering design of an instrument panel for a vehicle is provided that considerably reduces design time and related expenses. Another advantage of the present invention is that a method of knowledge-based engineering design is provided that utilizes parametric automated design in light of predetermined engineering and manufacturing criteria. Yet another advantage of the present invention is that a method of knowledge-based engineering design of an instrument panel is provided that allows analysis of vehicle packaging feasibility early in the design process. Still another advantage of the present invention is that a method of knowledge-based engineering design of an instrument panel is provided which supports computer-aided engineering analysis (CAE) and rapid prototyping. A further advantage of the present invention is that a method of knowledge-based engineering design of an instrument panel is provided that enhances flexibility in design, while still meeting vehicle timing considerations. Still a further advantage of the present invention is that a method of knowledge-based engineering design is provided that utilizes knowledge, guidelines and lessons learned from design, engineering and manufacturing experience to design an instrument panel to improve the quality, reduce development time and reduce the cost of an instrument panel.

Other objects, features and advantages of the present invention will be readily appreciated, as the same becomes better understood after reading the subsequent description taken in conjunction with the accompanying drawings.

BRIEF DESCRIPTION OF THE DRAWINGS

FIGS. 5, 6, 7, 8, 9a, 9b, 9c, 10, 11, 12 and 13 are flowcharts of another embodiment of a method of knowledge-based engineering design of an instrument panel, according to the present invention.

DESCRIPTION OF THE PREFERRED EMBODIMENT(S)

Vehicle design, and in particular the design of an instrument panel 50 (FIG. 2) on a vehicle, is achieved according to the present invention with a generic, parametric driven design method. Advantageously, this method allows flexibility in vehicle design and engineering analysis of the design in a fraction of the time required using conventional design methods, since the design is automatically evaluated against rules in the knowledge base. Various computer-based tools are integrated into a single user interface to achieve this enormous time and expense savings, including solid modeling, parametric design, automated studies and a knowledge-based engineering library.

Figure 1:
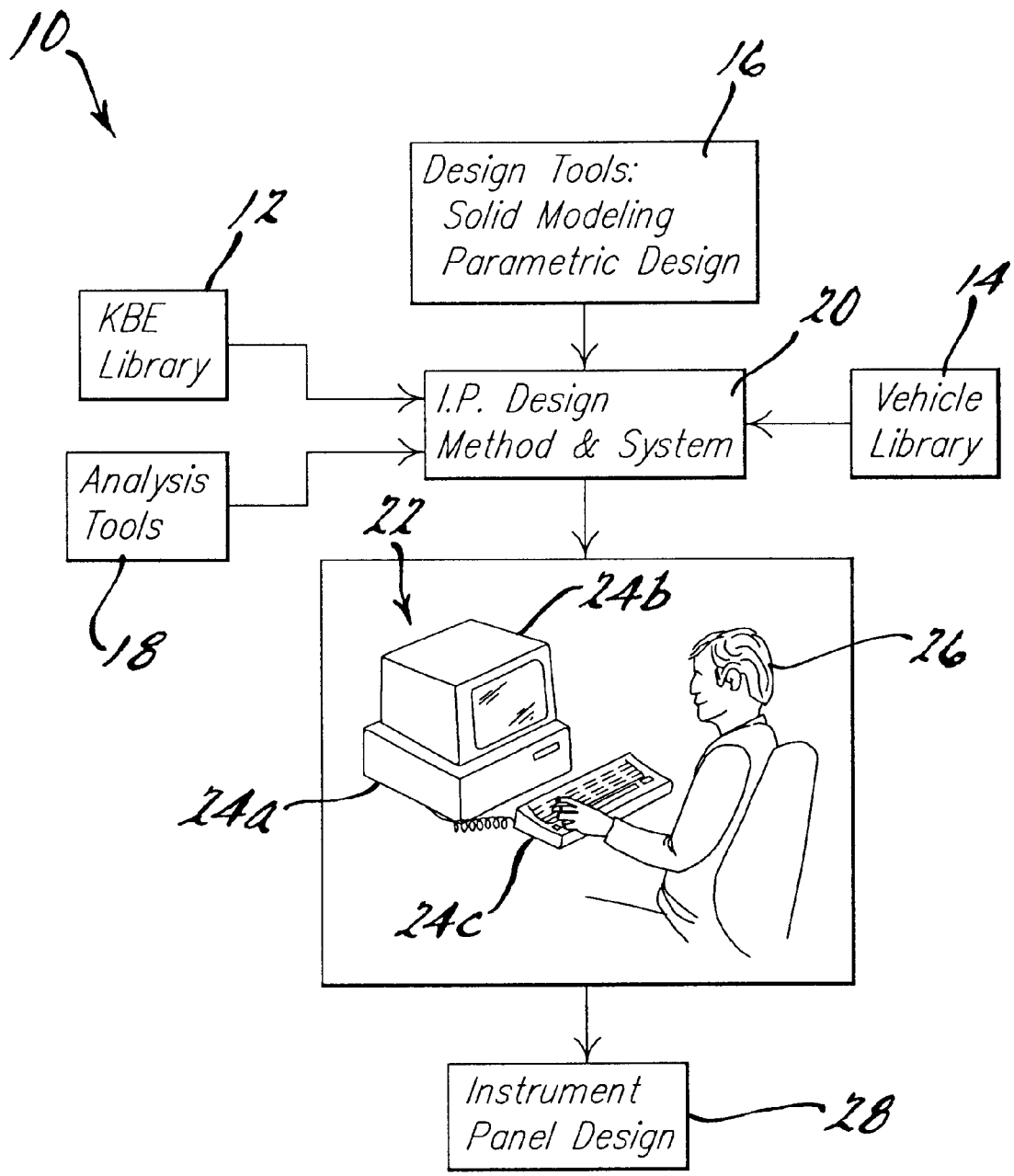
FIG. 1 is a block diagram of a system which may be utilized with a method of knowledge-based engineering design of an instrument panel for a vehicle, according to the present invention.

Referring to the drawings and in particular FIG. 1, the tools 10 used by a method for designing a instrument panel 50, according to the present invention, are illustrated graphically. The tools 10 include a knowledge-based engineering library 12 stored on an electronic storage device (not shown) The knowledge-based engineering library 12 includes design, engineering, and assembly rules for an instrument panel 50. In this example, the knowledge-based engineering library 12 is a database of sublibraries containing an electronic representation of various expert's knowledge of information relevant to the design of the instrument panel 50. For example, the knowledge-based engineering library 12 includes a component parts library containing a database of various types of component parts that may be supported by the instrument panel 50, in a manner to be described. Advantageously, the component part may be parametrically modelled.

The knowledge-based engineering library 12 also includes information in electronic form regarding various types of instrument panel architectures (to be described) that are available. Packaging studies incorporating these component parts on the instrument panel 50 can be done to assess many factors relating to the design of the instrument panel 50. The knowledge-based engineering library 12 still also includes a fastener library containing a database of various types of fasteners that may be utilized with the instrument panel 50. It should be appreciated that the fastener may be parametrically modeled. The knowledge-based engineering library 12 further includes a feature library containing information regarding different features available on the instrument panel 50. The feature may also be parametrically modeled. The knowledge-based engineering library 12 may also provide interactive access to other web-based libraries, in a manner to be described.

The tools 10 also include a vehicle platform library 14 stored on the electronic storage device. The vehicle platform library 14 is an electrical representation of a vehicle platform or a portion thereof. For example, the vehicle platform library 14 may include a model of a particular vehicle body design, or a portion thereof. It should be appreciated that the vehicle platform library 14 may be a sub-library within the knowledge-based engineering library 12.

The tools 10 may also include various design tools, shown generally at 16, which can be used for this design method 20, in a manner to be described. These design tools 16 may include solid modeling and parametric design techniques. Solid modeling, for example, takes electronically stored vehicle platform data from the vehicle platform library 14 and standard component parts data from the knowledge-based engineering library 12 and builds complex geometry for part-to-part or full assembly interference checking. Several modeling programs are commercially available and generally known to those skilled in the art.

The parametric design technique is used in the electronic construction within a computer system 22 of a geometrically defined vehicle system, such as the instrument panel 50, or a component part therein. As a particular dimension or parameter is modified for a particular feature of the instrument panel 50 or component part therein, the computer system 22 is instructed to regenerate a new geometric model. The knowledge-based engineering library 12 is used to control and limit the design process in accordance with predetermined design parameters, to be described.

The tools 10 also include various computer-aided engineering (CAE) analysis tools 18. One example of an engineering analysis technique is a human factors study, to be described. Another analysis tool 18 is computational fluid dynamics (CFD), as is known in the art The tools 10 further include the computer system 22 as is known in the art to implement a method and system 20 for designing the instrument panel 50. The computer system 22 includes a processor and a memory 24a, which can provide a display and animation of a system, such as the instrument panel 50, on a display device such as a video terminal 24b. Parametric selection and control for the design can be achieved by a user 26, via a user interactive device 24c, such as a keyboard or a mouse. The user 26 inputs a set of parameters and set of instructions into the computer system 22 when prompted to do so by the method 20. The set of parameters and the set of instructions may be product specific, wherein other data and instructions non-specific to the product may already be stored in the computer system 22.

One example of an input method is a pop-up window with all current parameters, including an on-line description for the parameter and a current value therefore. For example, parametric values may be chosen from a table within a two-dimensional mode, since some vehicle designers prefer to view an assembly in sections which can be laid out on a drawing.

Once the computer system 22 receives the set of parameters and instructions from a user 26, the computer system 22 utilizes a method, discussed in detail subsequently, to determine whether requirements have been met.

Advantageously, the computer implemented method of knowledge-based engineering design of an instrument panel 50 combines all of the foregoing to provide an efficient, flexible, and rapid design 28. Further, an instrument panel design is an output of the method 20, and the design 28 is available for further analysis and study.

Figure 2:
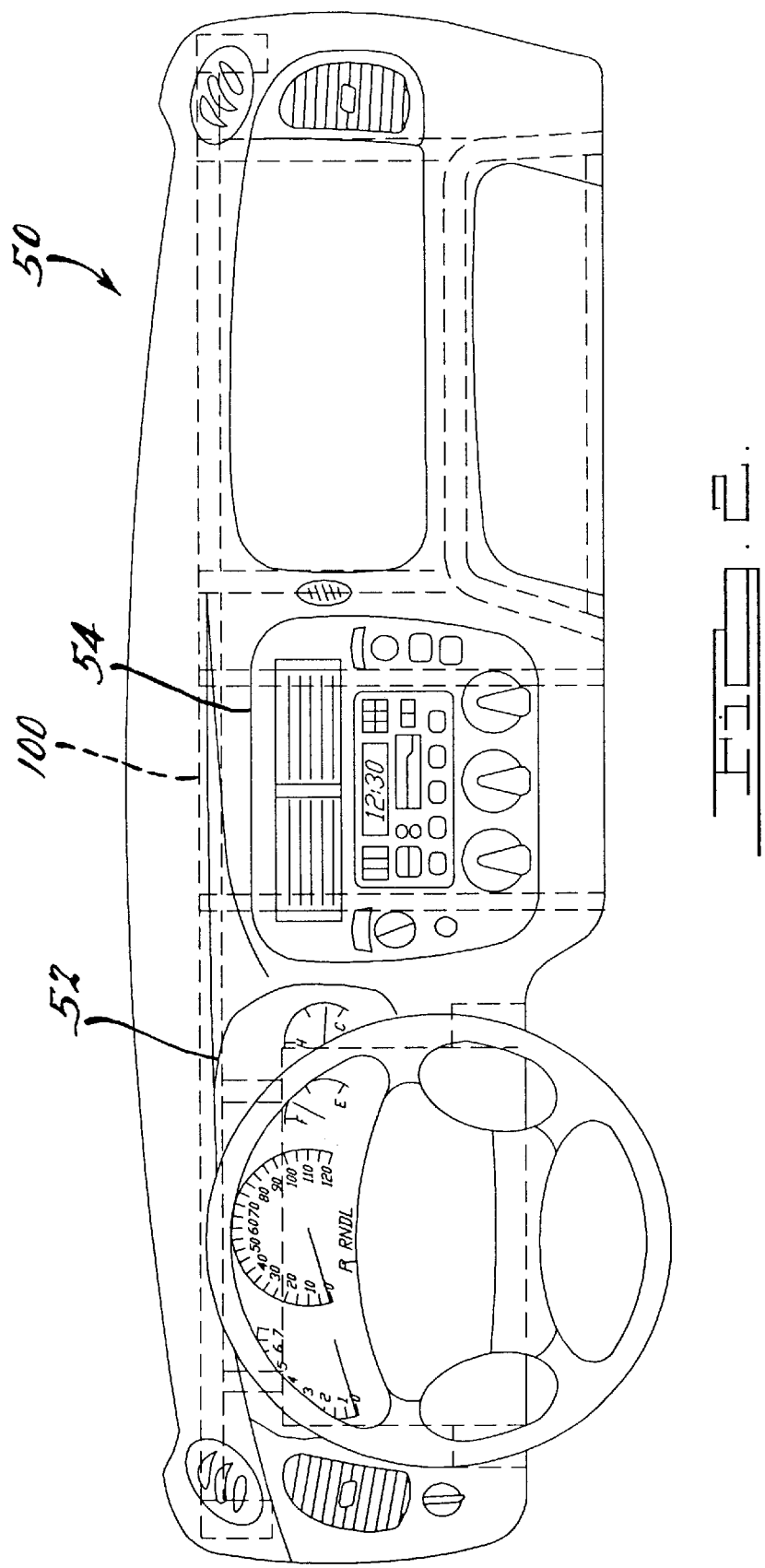
FIG. 2 is a plan view of an instrument panel for a vehicle, according to the present invention.
Figure 3:
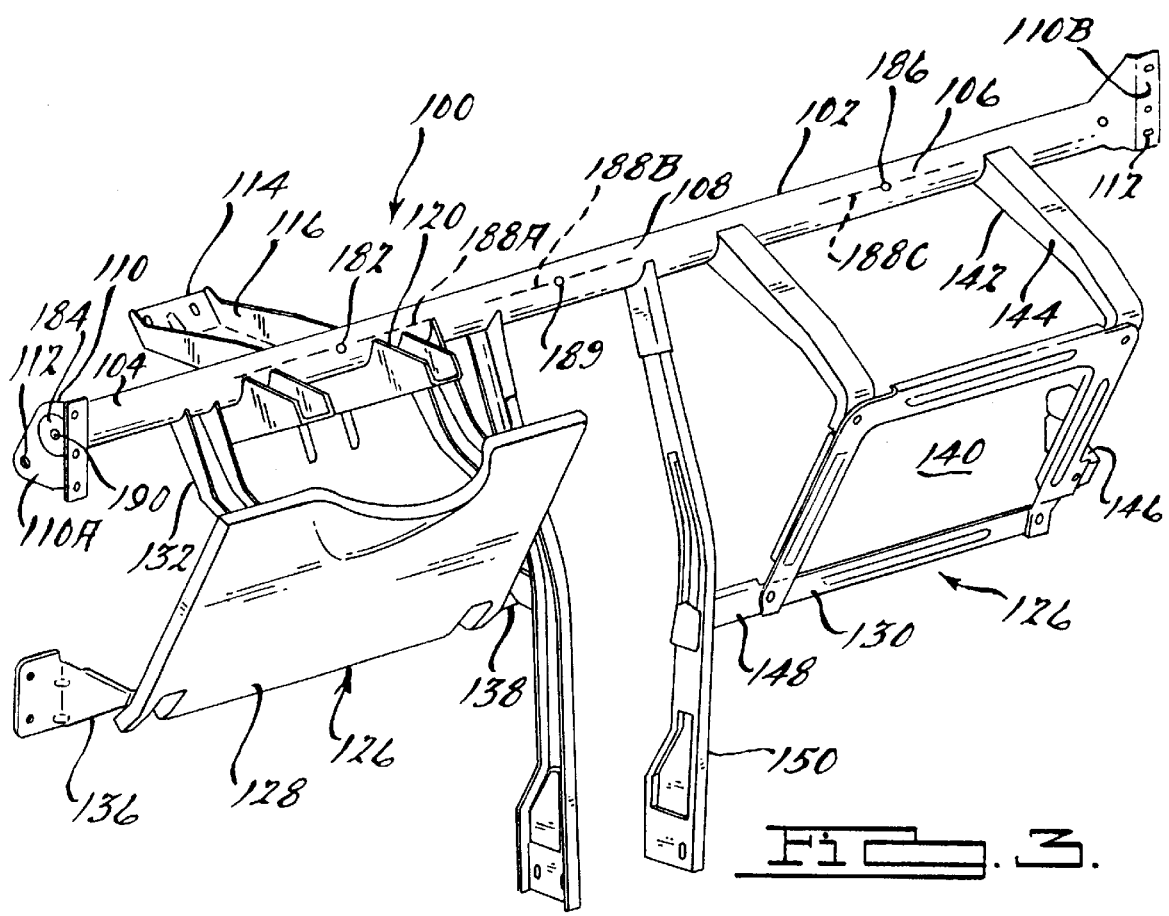
FIG. 3 is a perspective view of an instrument panel support structure for the instrument panel of FIG. 2.

Referring to FIGS. 2 and 3, the instrument panel 50, according to the present invention, is to illustrated for a vehicle (not shown), and in particular an automotive vehicle. The vehicle includes a vehicle body (not shown) which serves as a frame for the vehicle, as is known in the art. The vehicle body includes two side structures (not shown), which are referred to in the art as A-pillars. The vehicle body also includes a front structure (not shown), known as the dash panel, that forms a generally planar surface extending between the side structures. It should be appreciated that the vehicle front structures and side structure define an interior space of the vehicle referred to as the occupant compartment. The vehicle body includes a generally planar member (not shown) positioned between the side structures and extending from an upper edge of the dash panel into the occupant compartment, referred to in the art as a cowl. The instrument panel 50 is positioned between the side structures and rearward of the cowl, and attached to the vehicle in a manner to be described. Advantageously, the instrument panel 50 provides an attachment surface for components typically disposed therein, such as an instrument cluster 52, a radio 54 or the like.

The instrument panel 50 also includes an outer skin 56 covering an instrument panel support structure 100. Preferably, the outer skin 56 is made from a plastic material. The outer skin 56 may include a rigid foam material covering the plastic material to give the outer skin 56 a soft appearance and feel.

The instrument panel support structure 100 provides a frame for the instrument panel 50 and the components contained therein. The instrument panel support structure 100 includes a longitudinally extending beam 102, referred to in the art as a cross-car support beam. The beam 102 provides rigidity and support to the vehicle body and an attachment surface for various components, in a manner to be described. The beam 102 may be divided into a driver side portion 104 on one end, and a passenger side portion 106 on another end, and a central portion 108 between the passenger side portion 106 and the driver side portion 104.

In this example, the shape of the beam 102 is parametrically determined in light of various input parameters that associatively link a parameter to a coordinate in space. For example, an input parameter is a dimensional coordinate for the attachment locations of the beam 102 relative to the vehicle body. Another input parameter is the axis of the beam 102. Still another is the relative shape of the vehicle body and related components.

The beam 102 includes an end bracket 112 for attaching the beam 102 to part of the vehicle body, such as the cowl, in this example. The end bracket 110 is generally planar, and is joined onto an end of the beam 102, using a suitable means such as welding. Preferably, there is a left end bracket 110A located on the end of the driver side portion 104 of the beam 102 and a right end bracket 110B located on the end of the passenger side portion 106 of the beam 102. The left and right end brackets 110A, 110B may each include an aperture 112 for receiving a fastener (not shown), such as a bolt, to secure the beam 102 to the cowl.

In this example, the left or right end rackets 110A, 110B have an general "L" shape. It should be appreciated that the left end bracket 110A may have a different shape than the right end bracket 110B, depending on the design of the beam 102. Advantageously, the shape of the right or left end bracket 110A, 110B is determined in light of mating associative parts defining the attachment location of the beam 102 relative to the vehicle body.

The instrument panel support structure 100 also includes an upper attachment bracket 114, also referred to as a cowl top bracket, for attaching the beam 102 to the cowl. The upper attachment bracket 114 is generally planar and extends radially from the beam 102 a sufficient distance to secure the instrument panel support structure 100 to the cowl. The upper attachment bracket 114 may include a flange 116 extending from a side edge of the upper attachment bracket 114 to provide additional strength to the upper attachment bracket 114.

In this example, the upper attachment bracket 114 has a general "J" shape. Advantageously, the shape of the upper attachment bracket 114 may be parametrically determined using an input parameter, such as a coordinate point in 3-dimensional space representing an attachment location of the cowl to the vehicle body structure. Another end of the upper attachment bracket 114 is associatively referenced to another input parameter, such as a centerline for the beam 102.

An end of the upper attachment bracket 114 is secured to the beam 102 by a suitable joining means such as welding. Another end of the upper attachment bracket 114 is secured to the cowl by a suitable means such as a fastener (not shown). The upper attachment bracket 114 includes an aperture (not shown) for receiving the fastener to secure the upper attachment bracket 114 to the cowl.

The instrument panel support structure 100 also includes a steering column support bracket 120 for supporting the steering column (not shown), as is known in the art. The steering column support bracket 120 is a generally planar member extending radially from the beam 102 a sufficient amount in a rearward vehicle direction. In this example, the steering column support bracket 120 has a flange 122 extending along a side edge to provide additional strength, so that the steering column support bracket 120 has a generally "U"-shape.

The shape of the steering column support bracket 120 may be determined in light of a mating associated part, such as the design of the beam 102 and a three dimensional coordinate system representing a location for the steering column. An edge of the steering column support bracket 120 is attached to the beam 102 by a suitable joining means, such as welding. The steering column support bracket 120 may include a suitable means such as a fastener 124 to secure the steering column to the instrument panel support structure 100. It should be appreciated that, in this example, there are two steering column support brackets 120 positioned parallel each other.

The instrument panel support structure 100 also includes a knee bolster 126. The knee bolster 126 absorbs energy of a portion of an occupant's body (not shown), such as a knee, under certain conditions. One example of a condition is the movement of an unrestrained occupant as a result of an impact with another object (not shown). In this example, there are two knee bolsters 126, a driver side knee bolster 128 and a passenger side knee bolster 130.

The driver side knee bolster 128 is a generally planar member that is attached to the driver side portion 104 of the instrument panel support structure 100 by a plurality of attachment brackets 132, 136, 138. The location in driver side space of the knee bolster 128 is driven by information such as, input from a design tool 16 such as a knee bolster study.

An upper driver side knee bolster attachment bracket 132 interconnects an upper edge of the driver side knee bolster 128 with the beam 102. Advantageously, the upper driver side knee bolster attachment bracket 132 absorbs energy resulting from an impact with an object. The upper driver side knee bolster attachment bracket 132 is a generally planar member having a flange extending along an edge to provide additional structural strength. The upper driver side knee bolster attachment bracket 132 has a generally J-shape. Advantageously, the shape of the upper driver side knee bolster attachment bracket 132 is determined in light of mating associative parts, including the driver side knee bolster 128, and the diameter of the beam 102, as well as an input from a design tool 16 such as the knee bolster study.

Preferably, one end of the upper driver side knee bolster attachment bracket 132 is secured to the beam 102 using a suitable joining means such as welding. Another end is secured to the driver side knee bolster 128 using a suitable means such as a fastener (not shown). It should be appreciated that, in this example, there are two upper driver side knee bolster attachment brackets 132.

An outer driver side knee bolster attachment bracket 136 secures an outer edge of the driver side knee bolster 128 to the vehicle body. The outer driver side knee bolster attachment bracket 136 is generally planar. In this example, the outside driver side knee bolster attachment bracket 136 has a generally "Z"-shape. Advantageously, the shape of the outer driver side knee bolster attachment bracket 136 is determined from information regarding the position and shape of the driver side knee bolster 128 relative to the vehicle body. Preferably, one end of the outer driver side knee bolster attachment bracket 136 is secured to the driver side knee bolster 128 by a suitable means such as welding. Another end is also secured to the vehicle body by a suitable means such as a fastener (not shown).

An inner driver side knee bolster attachment bracket 138 secures an inner edge of the driver side knee bolster 128 with a center support bracket 150, to be described. The inner driver side knee bolster attachment bracket 138 is generally planar. In this example, the inner driver side knee bolster attachment bracket 138 has a generally "L"-shape. Advantageously, the shape of the inner driver side knee bolster attachment bracket 138 is determined in light of information regarding its associativity to the position and shape of the driver side knee bolster 128 and a center support bracket 150 to be described. Therefore, the design can change the shape of the inner knee driver side bolster attachment bracket 138 from a generally "L" to a "Z". Preferably, one end of the inner driver side knee bolster attachment bracket 138 is secured to the driver side knee bolster 128 by a suitable means such as welding. Another end is also secured to the vehicle body by a suitable means such as a fastener (not shown).

The passenger side knee bolster 130 is a generally rectangular member extending from the passenger side portion 106 of the beam 102. In this example, the passenger side knee bolster 130 has a central cavity 140 for receiving a glove box member (not shown), as is known in the art. In this example, the location of the passenger side knee bolster 130 is driven by information from the design tool 16, such as the knee bolster study, and associatively referenced to the beam 102.

The passenger side knee bolster 130 is secured to the beam 102 by an upper passenger side knee bolster attachment bracket 142. The upper passenger side knee bolster attachment bracket 142 interconnects an upper edge of the passenger side knee bolster 130 with the passenger side portion 106 of the beam 102. Advantageously, the upper passenger side knee bolster attachment bracket 142 also absorbs energy resulting from an impact with an object.

The upper passenger side knee bolster attachment bracket 142 is a generally planar member having a flange 144 extending along an edge to provide additional structural strength. The upper passenger side knee bolster attachment bracket 142 has a generally J-shape. In this example, the shape of the upper passenger side knee bolster attachment bracket 142 is determined in light of information regarding the position and orientation of mating surfaces of the beam 102 and the passenger side knee bolster 130, and an input from a design tool 16 such as the knee bolster study.

Preferably, one end of the upper passenger side knee bolster attachment bracket 142 is secured to the passenger side portion 106 of the beam 102 using a suitable means such as welding. Another end of the attachment bracket 142 is secured to the passenger side knee bolster 130 using a suitable means such as a fastener (not shown). It should be appreciated that, in this example, there are two upper passenger side knee bolster attachment brackets 142.

An outer passenger side knee bolster attachment bracket 146 secures an outer edge of the passenger side knee bolster 130 with the vehicle body. The outer passenger side knee bolster attachment bracket 146 and outer driver side knee bolster attachment bracket 136 may have the same shape. The outer passenger side knee bolster attachment bracket 146 is generally planar. In this example, the outer passenger side knee bolster attachment bracket 146 has a generally "Z"-shape. Advantageously, the shape of the outer passenger side knee bolster attachment bracket 146 is associated with the passenger side knee bolster 130 and the vehicle body. Preferably, one end of the outer passenger side knee bolster attachment bracket 146 is secured to the passenger side knee bolster 130 by a suitable means such as welding. Another end of the attachment bracket 146 is also secured to the vehicle body by a suitable means such as a fastener.

An inner passenger side knee bolster attachment bracket 148 secures an inner edge of the passenger side knee bolster 130 with the center support bracket 150. The inner passenger side knee bolster attachment bracket 148 is generally planar. In this example, the inner passenger side knee bolster attachment bracket 148 has a general "L"-shape. Advantageously, the shape of the inner passenger side knee bolster attachment bracket 148 is determined in a manner similar to the inner driver side knee bolster attachment bracket 142, previously described. Preferably, one end of the outer passenger side knee bolster attachment bracket 146 is secured to the passenger side knee bolster 130 by a suitable means such as welding. Another end of the inner passenger side knee bolster attachment bracket 148 is also secured to the vehicle body by a suitable means such as a fastener (not shown).

The instrument panel support structure 100 includes a center support bracket 150 extending between a central portion 108 of the beam 102 and a portion of the vehicle body such as a floor (not shown). The center support bracket 150 provides a mounting surface for a center component (not shown) disposed within the instrument panel, such as an audio component or a heating, ventilation and air conditioning HVAC controller, as is known in the art.

The center support bracket 150 is generally planar, and extends longitudinally a sufficient distance to provide support to components disposed therein. In this example, a side edge has a flange extending therealong to enhance the structural integrity of the center support bracket 150. An upper end of the center support bracket 150 is secured to the beam 102 by a suitable means such as welding. A lower end of the center support bracket 150 is secured to the vehicle body, by a suitable means such as a fastener (not shown). In this example, there are two center support brackets 150 positioned a predetermined distance apart from each other.

Figure 4:
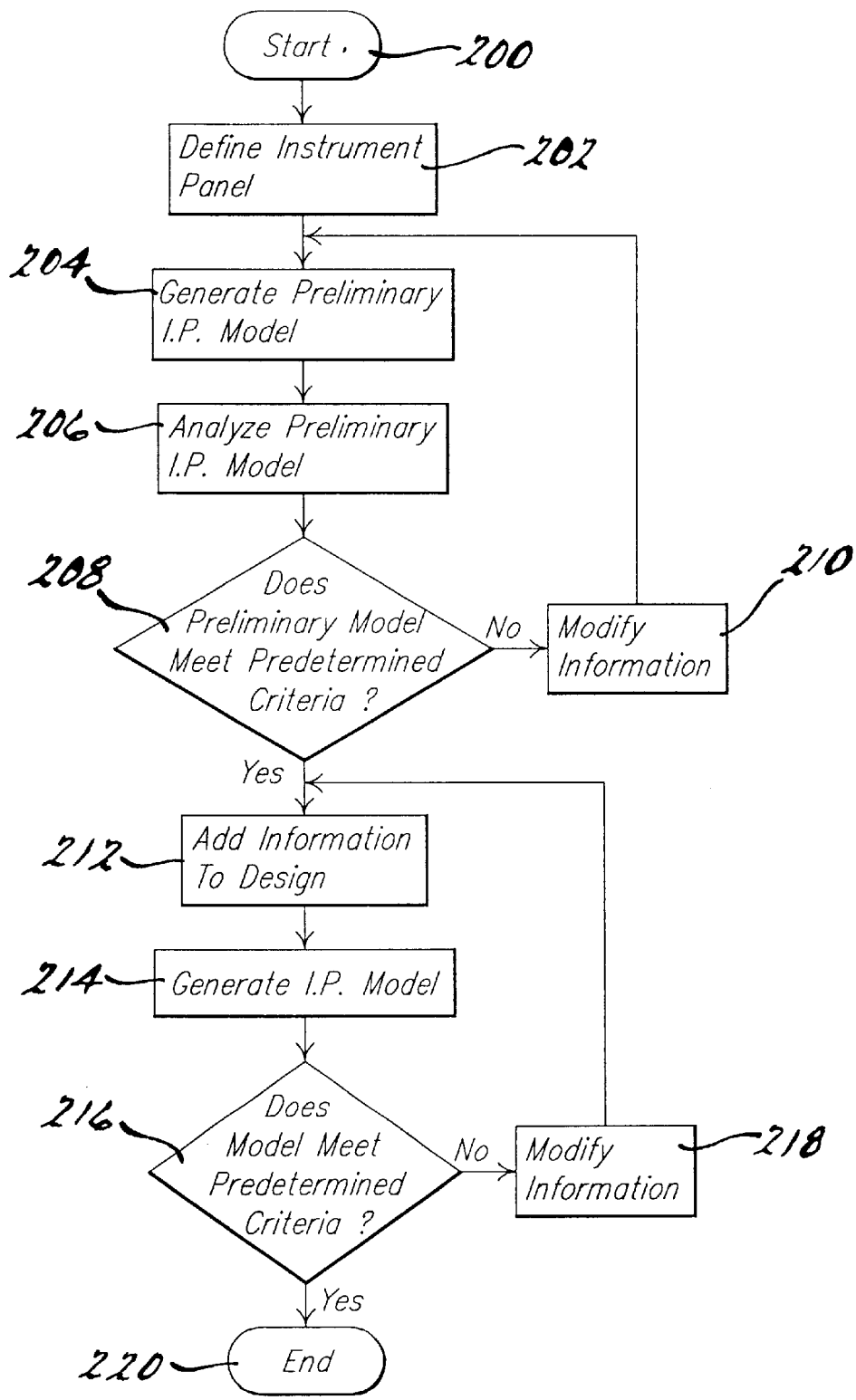
FIG. 4 is a flowchart of a method of knowledge-based engineering design of an instrument panel, according to the present invention.

Referring to FIG. 4, a flowchart of a method of knowledge-based engineering design of the instrument panel 50, according to the present invention, is illustrated. Advantageously, the method embeds knowledge, guidelines and lessons learned from design, engineering and manufacturing experts to interactively develop a new instrument panel design. The methodology begins in bubble 200, when it is called for by the user 26. The methodology advances to block 202 and defines parameters of the instrument panel 50 for a particular vehicle type. In this example, the parameters are defined in a product definition module, to be described. For example, a parameter from the vehicle platform library 14 includes information in electronic form regarding the vehicle environment, such as interior size, as well as a vehicle body model. Another parameter from the knowledge-based engineering library 12 is information regarding vehicle systems, including a type of instrument panel and component parts disposed within the instrument panel 50.

Still another parameter is the shape of the instrument panel 50, as defined by coordinates in space that reference the general shape of the instrument panel 50 and position the instrument panel 50 with respect to the vehicle body. In particular, these coordinate points define specific reference points on the cross car support beam 102 for determining the shape and attachment of the cross car support beam 102 and other components or brackets that may be secured to the beam 102 or a portion thereof. The methodology advances to block 204.

In block 204, the methodology electronically generates a preliminary model of the instrument panel 50 using the parameters from block 202 and packages the instrument panel 50 in relation to the vehicle systems previously described. The model is generated using the design tool 16 such as a computer aided design technique, as is known in the art. Preferably, the appropriate relationships between the instrument panel 50, vehicle body and other vehicle structures are automatically determined and based upon the information provided from the knowledge-based engineering library 12 and definition of the instrument panel 50.

It should be appreciated that packaging refers to an electronic representation of the dimensions of the system, device or component as it geometrically relates to a three-dimensional reference frame of the vehicle. These vehicle systems may include, but are not limited to the instrument panel 50, the dash panel, cowl side structure, instrument panel support structure 100, and HVAC assembly (not shown). A vehicle system is intended to include any part of the vehicle which will interact with the instrument panel 50 either directly or indirectly.

The methodology advances to block 206 and evaluates the preliminary instrument panel model using the design tool 16 such as CAE or the analysis tool 18, such as a human factors study, or CFD. The methodology advances to block 208 and determines if the preliminary model of the instrument panel design meets a predetermined criteria from the knowledge-based engineering library 12. An example of a predetermined human factors design criteria includes reach to the instrument panel 50, ergonomics or knee bolster position. An example of a predetermined performance criteria is a stress or vibration limit, as is known in the art.

If the preliminary design does not meet the predetermined criteria, the methodology advances to block 210 and modifies a previously defined parameter and returns to block 204, previously described. If the preliminary design does meet the predetermined criteria, the methodology advances to block 212. In block 212, the user 26 defines additional parameters of the instrument panel 50 using the knowledge-based engineering library 12, to generate a more detailed model of the instrument panel design. For example, the additional parameters may provide a more detailed representation of the surface of the instrument panel 50, and include features such as bosses, and fasteners.

The methodology advances to block 214 and electronically generates a detailed model of the instrument panel design, as previously described. The methodology advances to diamond 218 and determines if the detailed model meets a predetermined criteria such as a rule or guideline from the knowledge-based engineering library 12. An example of a predetermined criteria is a feature design guideline from a feature library, to be described. Another example of a predetermined criteria is the availability of a fastener from a fastener library, to be described. Still another example of a predetermined criteria is the shape of a radial edge from a tooling feasibility library, to be described.

If the predetermined criteria is not met, the methodology advances to block 216 and modifies a defined parameter and returns to block 212, previously described. If the predetermined criteria is met, the methodology advances to block 220. In block 220 the design is complete and the methodology ends.

Referring to FIGS. 5 through 13, a detailed example of another embodiment of the method of knowledge-based engineering design of the instrument panel 50 is illustrated. The methodology begins in bubble 300, when it is called for by a user 26. The methodology advances to 302 and the user 26 selects a vehicle model from a database, such as the vehicle platform library 14. The methodology advances to block 304 and the user 26 selects a knowledge-based module for developing an instrument panel design. The knowledge-based module provides for the development of an aspect of the instrument panel design, in a manner to be described. It should be appreciated that the flexability of the method allows for additional knowledge-based modules to be included in the method. It should also be appreciated that the knowledge-based modules may be interactively accessed by the user 26 in a preferred order.

Figure 5A:
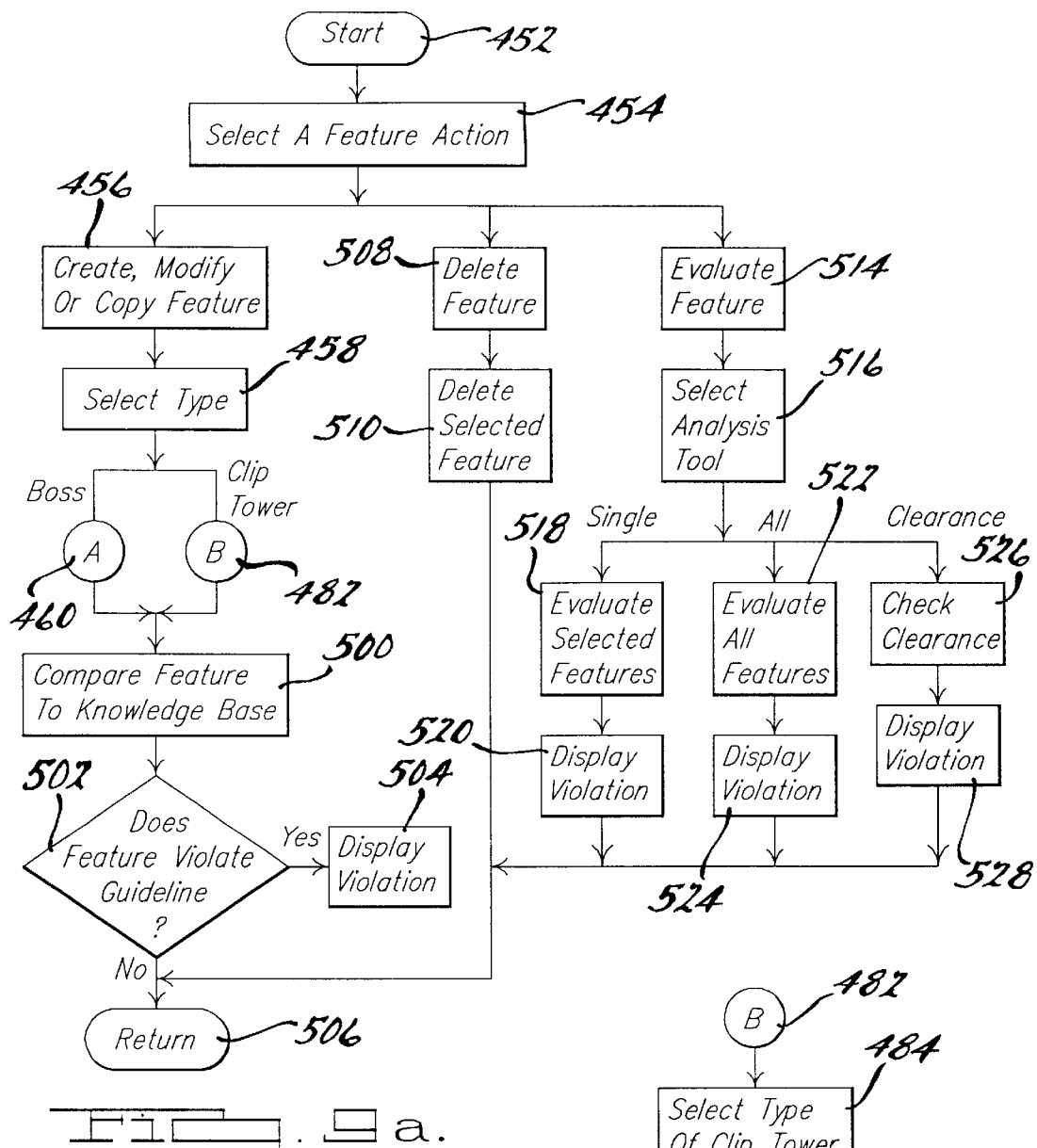
Figure 5C:
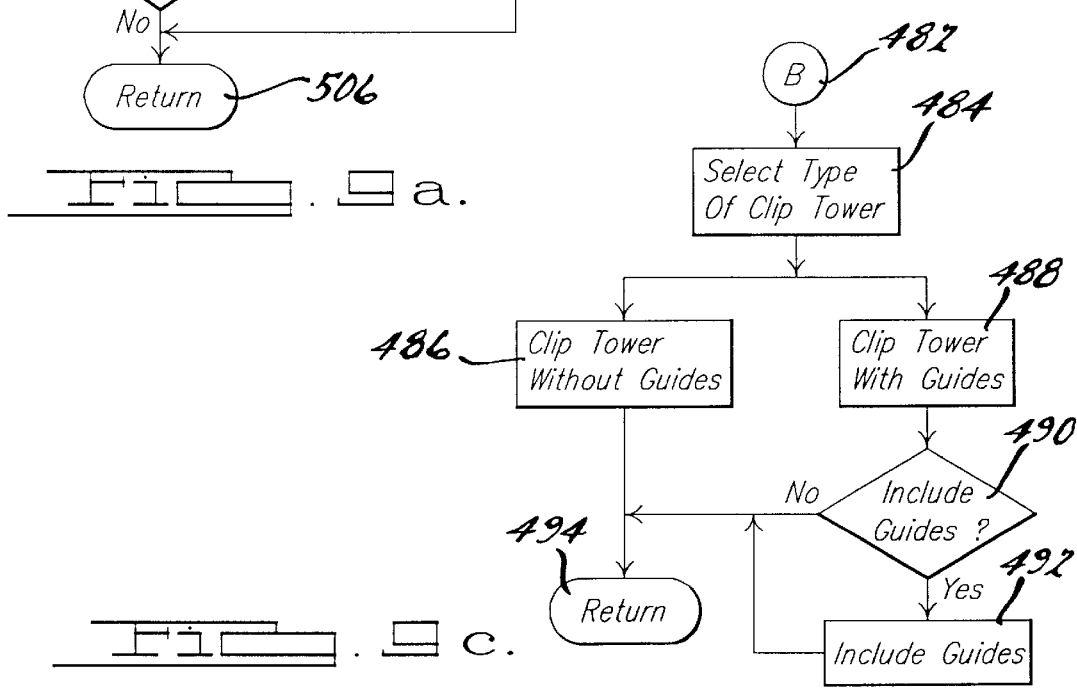

If the user 26 selects a product definition module, the methodology advances to circle 310, and continues to bubble 312 shown in FIG. 5. The methodology begins in circle 312 and continues to diamond 314. In diamond 314, the methodology determines if a model of an instrument panel design is already available. Preferably, the model includes coordinate points that reference the shape of the instrument panel 50. If a model of the instrument panel design is not available, the methodology advances to block 316 and obtains the model of the instrument panel 50, such as from the vehicle platform library 14 and continues to diamond 318. If a model of the instrument panel 50 is available, the methodology advances to diamond 318.

In diamond 318, the methodology determines if parameters, such as characteristics or attributes, have already been defined for the model of the instrument panel 50. The parameters influence design, engineering and manufacturing requirements of the instrument panel 50. An example of a parameter is the model year. Another example of a parameter is an anticipated production volume on a per year basis. Still another parameter is whether steering is on the left side or the right side. A further parameter is an anticipated date of first production.

If parameters have not been defined for the model, the methodology advances to block 320. In block 320, the methodology defines parameters for the model of the instrument panel design. For example, the user 26 interactively supplies the parameter to the method when asked to do so. The methodology advances to block 322, to be described.

Referring back to diamond 318, if the parameters have been defined, the methodology advances to block 322. In block 322, the methodology selects a parameter, such as a characteristic or attribute, of the instrument panel 50 from the knowledge-based engineering library 12. One characteristic of an instrument panel is a soft instrument panel. Another characteristic of instrument panel is a hard instrument panel. The methodology advances to block 324.

In block 324, the methodology selects a component part and its parameters to be included within the model from the knowledge-based engineering library 12. One example of a component part is the skin 56 covering the instrument panel 50. Its attribute is the material type and characteristics substrate. Another example of a component part is the cross car support beam 102 and its attribute is material type. Another example of a component part usually disposed within the instrument panel 50 include the radio 54, airbag (not shown) or HVAC unit (not shown) as previously described. The methodology advances to block 326 and returns to block 304 in FIG. 5.

Figure 7:
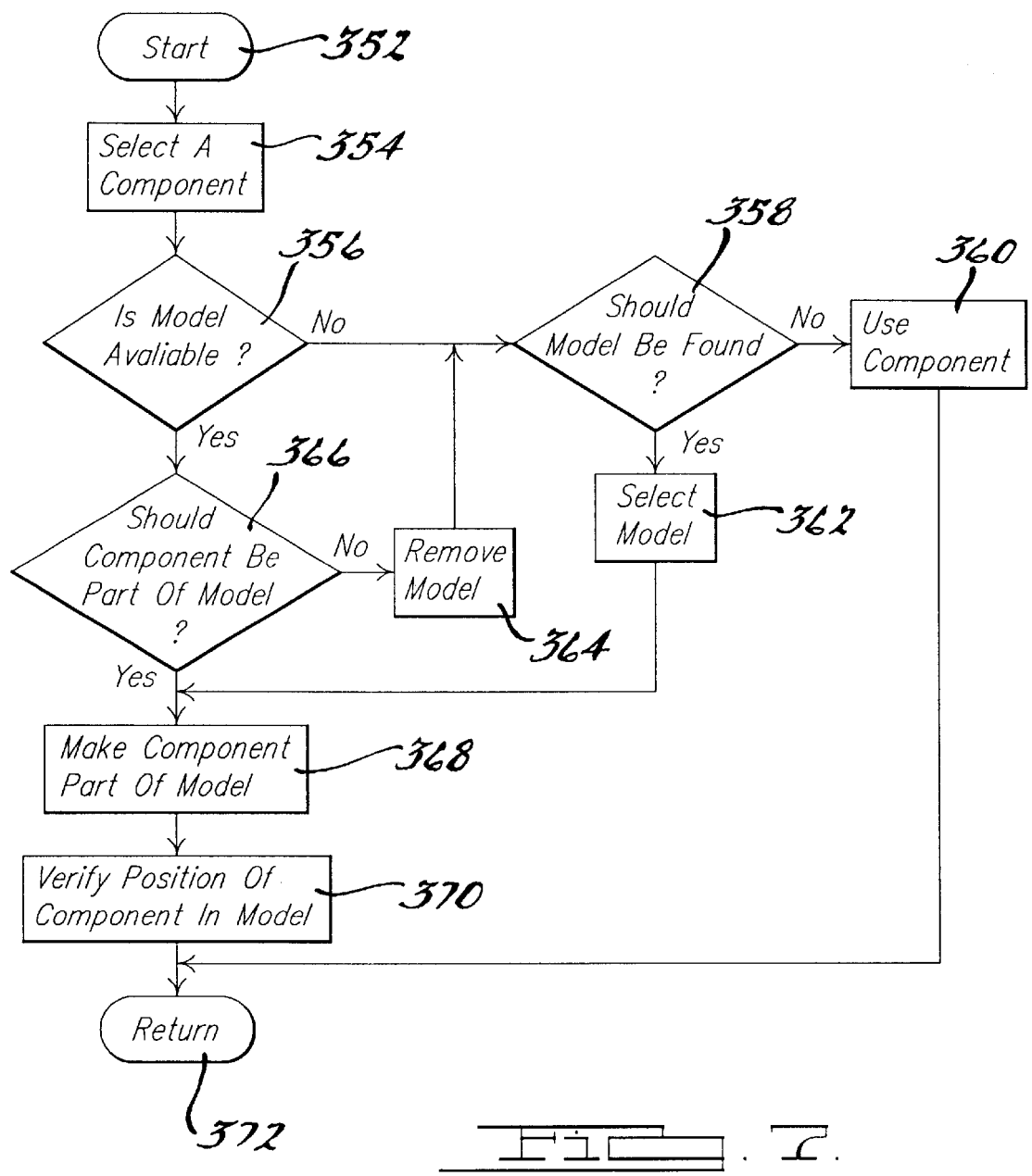

Referring back to block 304, if the user 26 selects a component part library module, the methodology advances to circle 350 and continues to bubble 352 shown in FIG. 7. The component part library is an electronic database within the knowledge-based engineering library 12 that contains information regarding particular component parts positioned within the instrument panel 50, for a packaging analysis of the instrument panel design. The methodology begins in bubble 352 and advances to block 354.

In block 354, the methodology selects a particular component to be included in the model. An example of a component is the radio 54, the HVAC unit, the instrument cluster 52 or the airbag. The methodology advances to diamond 356 and determines if a model of the instrument panel design is already defined within the knowledge-based engineering library 12. If the model of the instrument panel design has not been defined, the methodology advances to diamond 358 and the user 26 determines if another model should be selected. If another model should not be selected, the methodology advances to block 360. In block 360, only the selected component is available for further analysis by the method of instrument panel design. The methodology advances to circle 372 and returns to the entry point in block 304 of FIG. 5. Returning to diamond 358 if another model should be selected, the methodology advances to block 362 and selects another parametric model. The methodology advances to block 368, to be described.

Returning to diamond 356, if the model of the instrument panel design has been defined, the methodology advances to diamond 366. In diamond 366, the user 26 determines if the selected component part should be included in the defined model. If the selected component part should not be part of the defined model, the methodology advances to block 364. In block 364, the methodology does not use the selected model and advances to diamond 358, previously described.

Returning to diamond 366, if the selected component should be part of the defined model, the methodology advances to block 368 and generates a model of the instrument panel design that includes the selected component parts. The methodology advances to block 370 and verifies the position of the component part within the model. For example, the model may be compared to a predetermined design criteria set forth in the knowledge-based engineering library 112. The methodology advances to circle 372 and returns to the entry point from block 304 in FIG.

Referring to block 304, if a human factors module is selected, the methodology advances to circle 400 and continues to bubble 402 in FIG. 8. Advantageously, the human factors module is a human factors analysis that validates that the instrument panel design complies with packaging and ergonomic requirements. The methodology advances to bubble 402 and continues to block 404. In block 404, the methodology selects a model of the instrument panel design for analysis. It should be appreciated that the model may be a parametric, ergonomic model superposed on the model of the instrument panel. In this example, the selected model is in a computer-aided design (CAD) format, as is known in the art. The methodology advances to block 406.

In block 406, the methodology selects a particular portion of the instrument panel 50 for analysis. An example of a portion of the instrument panel 50 is the knee bolster 126. It should be appreciated that for a particular aspect of the instrument panel 50, a particular analysis may be performed. Thus, the human factors module will manage the model and select a necessary aspect of the selected application required in performing the analysis. The methodology advances to block 408.

In block 408, the methodology selects an analysis to be performed on the model from the analysis tools 18. An example of an analysis is a knee bolster study or reach study. It should be appreciated that the methodology may select one or more analyses to be performed either simultaneously or sequentially. The methodology advances to block 410.

In block 410, the methodology updates a parameter before conducting a human factor analysis. An example of a parameter is a seating reference point or a seat back angle. Advantageously, the parameters may be dynamically changed depending on which predetermined study was selected. The methodology advances to diamond 412 and determines if the parameter is valid when compared to a predetermined design criteria from the knowledge-based engineering library 12. For example, the methodology may check if the parameter is outside a range specified for the parameter, and indicate a suggested range. The methodology advances to diamond 414.

In diamond 414, the methodology compares the parameter to a knowledge-based engineering criteria or guideline contained within the knowledge-based engineering library 12 to determine if the parameter violates the predetermined criteria. If the parameter is in violation, the methodology returns to block 410, previously described. If the parameter does not violate a guideline, the methodology advances to block 416. In block 416, the methodology regenerates the model to include the parameters modified in block 410. The methodology advances to block 418 and selects a physical zone or portion of the model of the instrument panel design to be studied. Advantageously, the user 26 can superpose the current model on another model to visualize the result of the analysis. The methodology advances to block 420.

Figure 14:
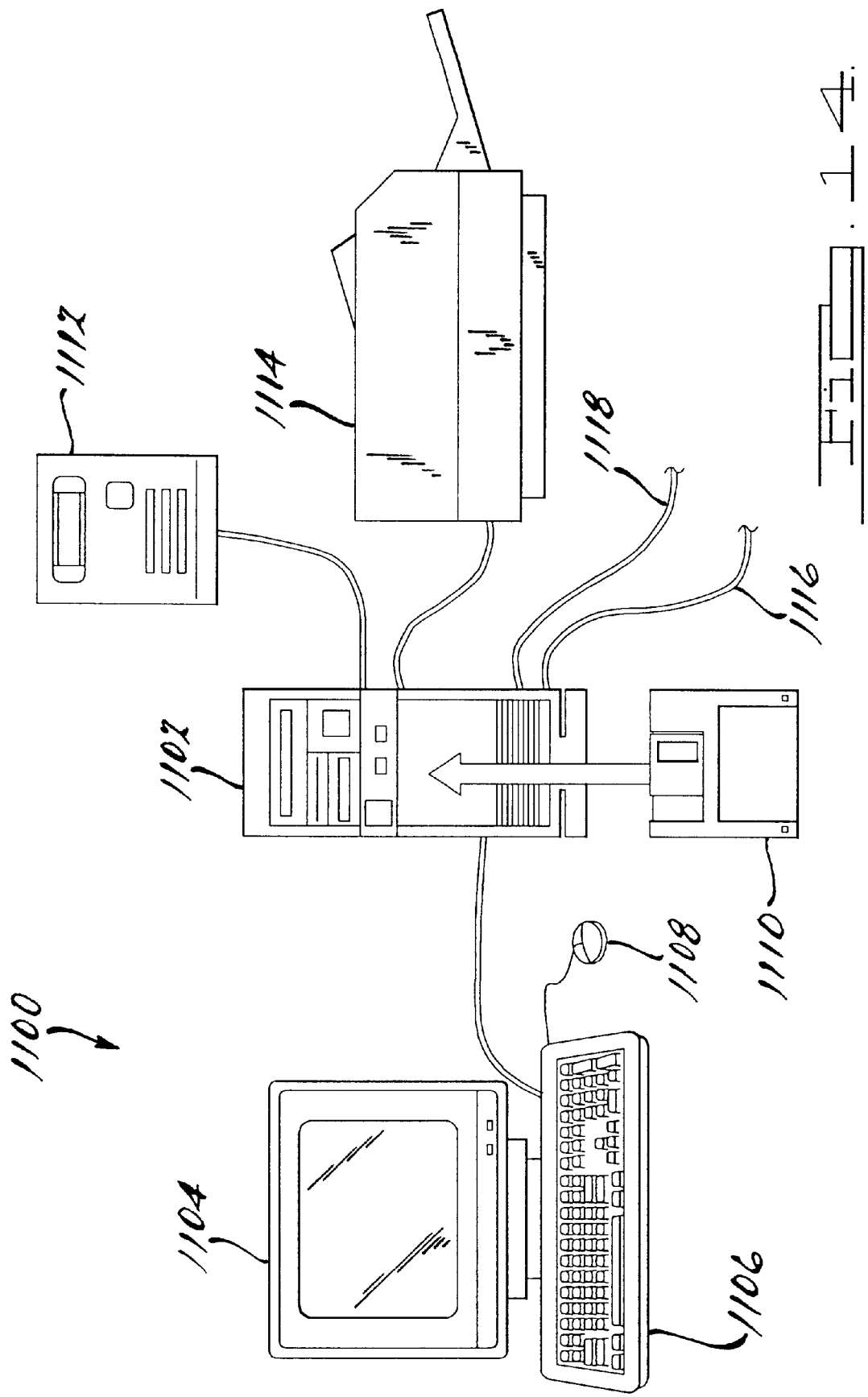
FIG. 14 is a view of a system for designing the instrument panel, according to the present invention.

In block 420, the methodology saves the results of human factors model on the computer system 1100 (FIG. 14). Advantageously, the human factors model may be exported into another analysis, as is understood in the art. The methodology advances to bubble 422 and returns to the entry point in block 304 in FIG. 5.

Referring to block 304 in FIG. 5, if a feature library module is selected by the user 26, the methodology advances to block 450, and continues to bubble 452 in FIG. 9A. The feature library module constructs and places various types of detailed features on the surface of the model for the instrument panel design. It also provides for modifications to existing features. An example of a feature is a boss or a clip tower. Advantageously, the feature library contains information regarding the types of features, so that the design of the feature can be evaluated. In bubble 452, the methodology advances to block 454. In block 454, the user 26 selects a feature action, including whether to create, modify, copy, delete or evaluate a feature.

If the user 26 selects to create, modify or copy a feature, the methodology advances to block 456 and continues to block 458. In block 458, the user 26 determines what type of feature is to be created, modified or copied. In this example, the options include a boss or a clip tower. It should be appreciated that the boss may include sub-features such as a boss, a hole, a counterbore, a material saver and a gusset. If the user 26 selects a boss to be created, modified or copied, the methodology advances to circle A shown at 460 in FIG. 9B and continues.

Figure 9B:
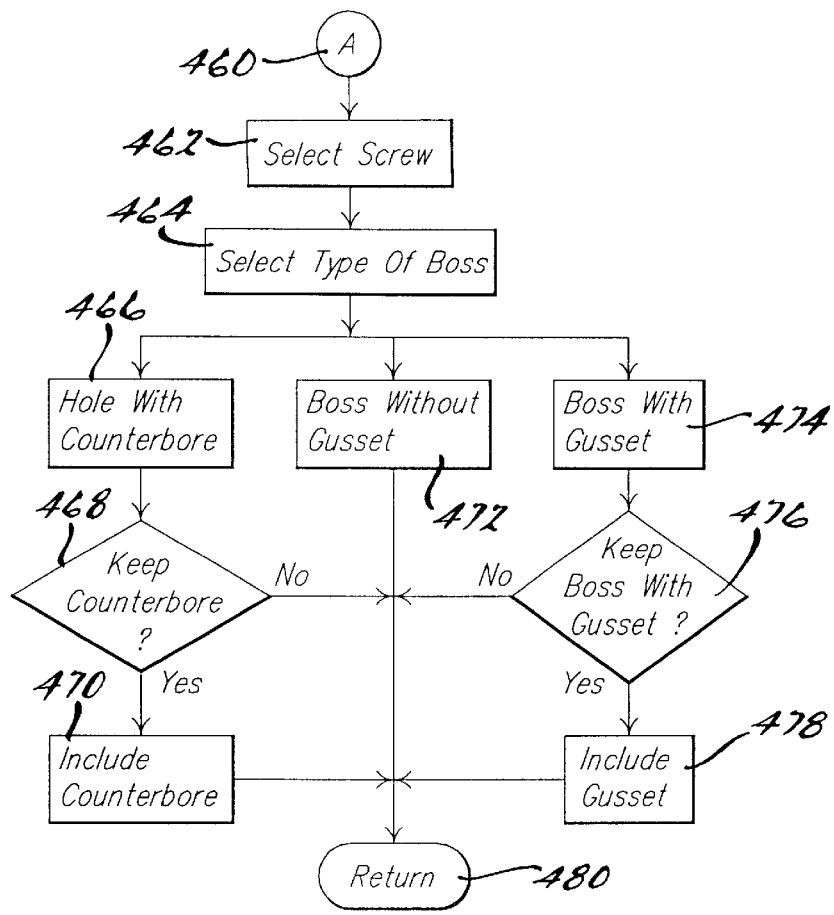
Figure 10:
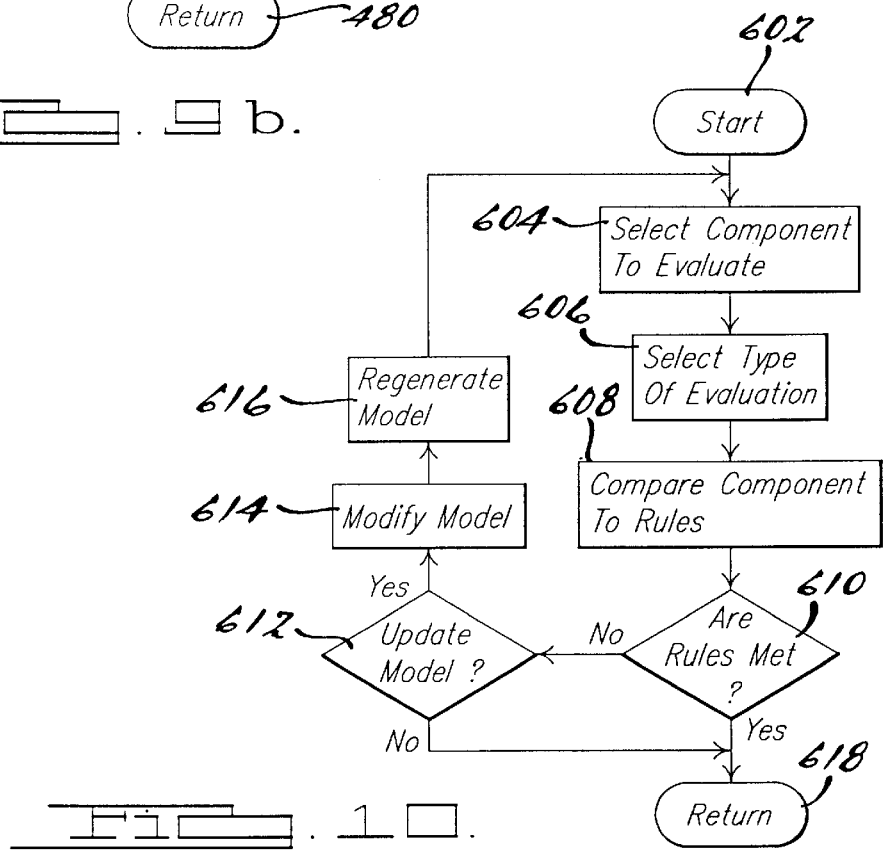

Referring to FIG. 9B, the methodology begins in circle A shown at 460 to create, modify or copy a boss, depending on the selected action. The methodology advances to block 462 and the user 26 selects characteristics of the boss. For example, a characteristic may be the type of surface, such as class A. Another characteristic is the material, such as ABS. Still another characteristic is a type of fastener, such as a screw. The methodology advances to block 464 and the user 26 selects a type of boss to be created, modified or copied. For example, if a boss including a hole with a counterbore is selected, the methodology advances to block 466 and the user 26 enters information regarding parameters of the counterbore, such as size and shape. For example, the counterbore may have either a cylindrical or a hexagonal shape. The diameter, depth and draft of the counterbore may also be entered.

The methodology advances to diamond 468 and the user 26 selects whether to keep the counterbore. If the counterbore should not be kept the methodology advances to bubble 470 and returns to the entry point from circle A and continues. Returning to diamond 468, if the counterbore should be kept, the methodology advances to block 470. In block 470, the methodology constructs a parametric model of the instrument panel design including the boss hole with the specified parameters for the counterbore. The methodology advances to bubble 480 and returns to the entry point from circle A.

Returning to block 472, if a boss without gussets is selected by the user 26, the methodology advances to block 480 and returns to the entry point from circle A and continues.

Returning to block 464, if a boss with gusset is selected, the methodology advances to block 474. In block 474, the user 26 provides information regarding parameters of the gusset, such as size, shape and quantity. In particular, the user 26 may specify land, draft, thickness, angle, shape and location of the gusset from the top of the boss.

The methodology advances to diamond 476 and determines if the boss with gusset should be kept in the model. If the boss with gusset should not be kept, the methodology advances to bubble 480 and returns to the entry point from circle A. If the boss with gusset should be kept, the methodology advances to block 478 and constructs a model of the instrument panel design including the boss with a gusset using the specified parameters for the boss and gusset. The methodology advances to bubble 480 and returns to the entry point from circle A.

Returning to block 458 of FIG. 9A, if the user 26 selects a clip tower feature, the methodology advances to circle B in FIG. 9C and continues. In circle B, shown at 458, the method constructs a clip tower. The methodology advances to block 484 and the user 26 selects a type of clip tower to construct, such as with a guide or without guide. If a clip tower without a guide is selected, the methodology advances to block 486. In block 486, the user 26 enters information regarding a parameter that defines the clip tower. For example, the parameters may define the material, height, width, length, thickness, draft, cut, chamfers and ribs. The methodology advances to bubble 494 and returns to the entry point from circle B.

Returning to block 484, if a clip tower with guides is selected by the user 26, the methodology advances to block 488. In block 488, the user 26 enters information regarding parameters defining the clip tower, as previously described, as well as information regarding the shape and location of a guide. The methodology advances to diamond 490 and the user 26 selects whether to include the guides in the model of the instrument panel design. If the guides should not be included, the methodology advances to bubble 494 and returns to the entry point from circle B.

Returning to diamond 490, if the guides should be included, the methodology advances to block 492 and generates a model of the instrument design panel that includes a clip tower with guides according to the entered parameters. The methodology advances to bubble 494 and returns to entry point from circle B.

Returning to FIG. 9A, the methodology advances to block 500 from circle A or circle B. In block 500, the feature is compared to a predetermined criteria such as a guideline or rule contained within the knowledge-base engineering library 12 for an initial determination of whether the feature violates the predetermined criteria. An example of a predetermined criteria is a component design guideline, or an injection molding guideline. The methodology advances to diamond 502 and determines from the comparison in block 500 if the feature violates the predetermined criteria. If the predetermined criteria is violated, the methodology advances to block 504. In block 504, the violation is displayed on a video terminal 24b. The methodology advances to bubble 506 and returns to block 304 in FIG. 5.

Referring back to diamond 502, if the guideline is not violated, the methodology advances to bubble 506 and returns to in block 304 in FIG. 5.

Returning back to block 454, if the user 26 selects a delete feature action, the methodology advances to block 508. In block 508, a type of feature to be deleted is selected and the methodology continues to block 510. In block 510, the feature is deleted from the model, and the model is regenerated without the feature. The methodology advances to bubble 506 and returns to block 304 in FIG. 5.

Returning to block 454, if an evaluate feature is selected, the methodology advances to diamond 514 and continues to diamond 516. In diamond 516, the user 26 selects a means of evaluating the feature. For example, if a single feature is selected, the methodology advances to block 518 and evaluates the selected feature by comparing the selected feature to a predetermined criteria from the knowledge-based engineering library 12 for any violations. The methodology advances to block 520 and displays the results of the evaluation on the video terminal 24b. The methodology returns to block 454 previously described.

Returning to diamond 516, if the user 26 selects multiple features to evaluate, the methodology advances to block 522 and evaluates all features by comparing all the features to a predetermined criteria from the knowledge-based engineering library 12 for any violations. The methodology advances to block 524 and displays the results of the evaluation on the video terminal 24b. The methodology returns to block 454 previously described.

Returning to diamond 516, if a clearance check is selected, the methodology advances to block 526. In block 526, the methodology determines if a clearance between two components is within a predetermined range from the knowledge-based engineering library 12. The methodology advances to block 528 and displays any violations on the video terminal 24b. The methodology advances to bubble 506 and returns to block 304 in FIG. 5.

Returning to block 304 of FIG. 5, if a tooling feasibility module is selected, the methodology advances block 600. In block 600, the methodology advances to bubble 602 shown in FIG. 10. Advantageously, the tooling feasibility module evaluates individual portions of the instrument panel 50 for various conditions that may affect how a tool is built to fabricate the instrument panel 50. An example of a condition is a die lock or undercut. Another example is a sharp edge. Still another condition is an inadequate draft. Advantageously, if a certain tooling condition is identified early in the design process and avoided, time, effort and cost can be saved.

The methodology continues to block 604 and selects a component part of the instrument panel 50 to evaluate. The methodology advances to block 606. In block 606, the user 26 selects a type of tooling feasibility evaluation to perform, such as a die lock check, sharp-edges check, or inadequate draft angle check. The methodology advances to block 608.

In block 608, the component part is compared to a predetermined tooling rule stored in the knowledge-based engineering library 12. For example, the knowledge-based engineering library 12 may contain a rule that a draft angle be a minimum angle of 0.50 degrees to obtain a sufficient draft. It should be appreciated that a portion of the component part may be evaluated or the entire component part.

The methodology advances to diamond 610 and determines from the comparison in block 608 if the rule from the knowledge-based engineering library 12 has been met. If the rule has not been met, the methodology advances to diamond 612 and the user 26 determines if the model of the instrument panel 50 should be updated. If the model should be updated the methodology advances to block 616 and modifies the model. The methodology advances to block 616 and regenerates the model of the instrument panel 50. The methodology returns to block 604 previously described.

Returning to diamond 612, if the model should not be updated, the methodology advances to bubble 618 and returns to block 304 in FIG. 5. Returning to diamond 610, if the rule is not met, the methodology advances to bubble 618 and returns to block 304 in FIG. 5.

Returning back to block 304 of FIG. 5, if a fastener library module is selected, the methodology advances to block 628 and advances to bubble 630 shown in FIG. 11. Advantageously, the fastener library is a database of available fasteners maintained in the knowledge-based engineering library 12. The methodology advances to diamond 632 and the user 26 selects a type of fastener. One example of a fastener is a screw. Another example of a fastener is a nut or clip. If a screw is selected the methodology advances to block 634. The methodology advances to block 636 and selects a particular screw from the fastener library database. Advantageously, the database can be sorted by a physical characteristic such as class of screw, or size or length of screw.

The methodology advances to block 638 and informs the user 26 of a guideline or rule from the knowledge-based library associated with usage of the type of screw selected on the video terminal 24b. The methodology advances to block 644, to be described. Returning to diamond 632, if a fastener type, such as a nut or clip, is selected, the methodology advances to block 640 and continues to block 642. In block 642, the user 26 selects a particular nut or clip from the fastener library database within the knowledge-based library 12. Advantageously, the database is sorted by a characteristic such as class of nut or type of clip. The methodology advances to block 644, and the user 26 selects a number of copies of the fastener to be included in the model of the instrument panel design.

The methodology advances to diamond 646 and the user 26 selects whether to include the fastener as part of the model of the instrument panel design. If the fastener should be included as part of the model, the methodology advances to block 648. In block 648, the methodology regenerates the model with the fastener included therein. The methodology advances to bubble 650 and returns to block 304 in FIG. 5. Returning to diamond 646, if the fastener should not be included with the model of the instrument panel design, the methodology advances to bubble 650 and returns to block 304 in FIG. 5.

Returning to block 304 in FIG. 5, if a fastener commonization module is selected, the methodology advances to circle 658, and advances to bubble 660 shown in FIG. 12. Advantageously, the fastener commonization module checks the model and looks for standard fasteners to improve the cost and assembly of the instrument panel 50. The methodology advances to block 662 and selects a model of an instrument panel design to check for fastener commonization. The methodology advances to block 664 and compares the fasteners used in the model to a predetermined list of standard fasteners maintained in the knowledge-based engineering library. 12. For example, the predetermined list of standard fasteners may be a list of fasteners used in a particular assembly plant. The methodology advances to block 666 and displays a list of standard fasteners identified in the model on a terminal 24b. Advantageously, the quantity and a part identification number can be included as part of the displayed information. The methodology advances to circle 668 and returns to block 304 in FIG. 5.

Returning to block 304 of FIG. 5, if the user 26 selects a knowledge-based library module, the methodology advances block 678 and advances to bubble 680 shown in FIG. 13. The methodology begins in bubble 680 and advances to block 682. In block 682, the user 26 selects a reference library from the knowledge-based engineering library 12. It should be appreciated that the reference library may be contained within the knowledge-based engineering library, or may be an external web-based library accessible through the knowledge-based engineering library 12. For example, the reference library may be related to the instrument panel 50, such as a library containing information regarding design guidelines and requirements. Still another reference library may contain benchmark information. A further reference library may contain federal guidelines. The methodology advances to bubble 684 and returns to block 304 in FIG. 5.

Returning to block 304 of FIG. 5, if the model of the instrument panel design is finished, the methodology advances to bubble 1000 and ends.

Referring to FIG. 14, a representative hardware system 1100 for implementing the method for knowledge-based engineering design of an instrument panel 50, according to the present invention, is illustrated. The hardware system 1100 includes a processing unit 1102 connected to a user interface which may include a video terminal 1104, a keyboard 1106, a pointing device, such as a mouse 1108, and the like. The processing unit 1102 preferably includes a central processing unit, a memory, and stored instructions which implement the method for designing the instrument panel 50, according to the present invention. The stored instructions may be stored within the processing unit 1102 in the memory, or in any non-volatile storage such as magnetic or optical media, EPROM, EEPROM, or the like. Alternatively, instructions may be loaded from removal magnetic media 1100, such as a removal disk, sometimes called a floppy disk, optical media 1112, or the like. In a preferred embodiment, the hardware system 1100 includes a general-purpose computer program to implement the functions illustrated and described with reference to FIGS. 1–13. Of course, a hardware system 1100, according to the present invention, could also be embodied with a dedicated device which includes various combinations of hardware and software.

The preferred embodiment may also include a printer 1114 connected to the processing unit 1102, as well as a network connection for accessing a local server, an intranet, and the Internet. Preferably, solid modeling software, parametric design software, surface rendering software, animation software, and the like are used for developing the hardware system 1100, according to the present invention.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of knowledge-based engineering design of an instrument panel for a vehicle, the method comprising the steps of:

defining a parameter of the instrument panel using a knowledge-based engineering library stored in a memory of a computer system;

generating a model of the instrument panel based on the parameter;

analyzing the model of the instrument panel;

comparing a result of the analysis of the model of the instrument panel to a predetermined criteria from the knowledge-based library; and varying the parameter so that the model of the instrument panel meets the predetermined criteria.

2. A method as set forth in claim 1 wherein the method includes the steps of defining an input parameter for the model of the instrument panel using the knowledge-based engineering library, and generating a model of the HVAC air-handling assembly based upon the input parameter.

3. A method as set forth in claim 2 wherein the method includes the steps of comparing the model of the instrument panel to a predetermined initial criteria from the knowledge-based engineering library, and varying the input parameter so that the model of the instrument panel meets the predetermined initial criteria.

4. A method as set forth in claim 3 wherein the predetermined criteria is a human factors design rule from the knowledge-based engineering library.

5. A method as set forth in claim 2 wherein the method includes the steps of comparing an engineering performance analysis of the model of the instrument panel to a predetermined performance criteria from the knowledge-based engineering library, and varying the input parameter so that the model of the instrument panel meets the predetermined performance criteria.

6. A method as set forth in claim 1 wherein the method includes the steps of defining a second parameter for the model of the instrument panel using the knowledge-based engineering library, and regenerating the model of the instrument panel using the second parameter.

7. A method as set forth in claim 6 wherein the second parameter is a feature defining a surface of the instrument panel from a feature library in the knowledge-based engineering library.

8. A method as set forth in claim 6 wherein the method includes the includes the steps of comparing the model of the instrument panel to a predetermined second criteria from the knowledge-based library, and varying the second parameter so that the model of the instrument panel meets the predetermined second criteria.

9. A method as set forth in claim 1 wherein said knowledge-based engineering library is an electronic database of sub-libraries of data accessible by a user designing the instrument panel.

10. A method of knowledge-based engineering design of an instrument panel in a vehicle, wherein the method comprises the steps of:

defining a vehicle body model from a vehicle library within the knowledge-based engineering library;

defining an input parameter for a model of the instrument panel using the knowledge-based engineering library;

generating a model of the instrument panel using the input parameter and the vehicle body model;

comparing the model of the instrument panel to a predetermined criteria from the knowledge-based library;

modifying the input parameter so that the model of the instrument panel meets the predetermined initial criteria;

defining a second parameter for the model of the instrument panel using the knowledge-based engineering library regenerating the model of the instrument panel using the second parameter;

comparing the model of the instrument panel to a second predetermined criteria from the knowledge-based engineering library; and varying either one of the input parameter or the second parameter so that the model of the instrument panel meets the second predetermined criteria.

11. A method as set forth in claim 10 wherein said step of defining an input parameter comprises defining a parameter describing characteristics of the vehicle from a product definition library within the knowledge-based engineering library.

12. A method as set forth in claim 10 wherein said step of defining an input parameter comprises defining a component part to be included within the model of the instrument panel from a component part library within the knowledge-based engineering library.

13. A method as set forth in claim 12 wherein the method includes the step of defining a component part parameter for the component part from the component part library.

14. A method as set forth in claim 10, wherein the predetermined criteria comprises a knowledge-based engineering design rule from a knowledge-based engineering library.

15. A method as set forth in claim 10, wherein the predetermined criteria comprises a computational fluid dynamics performance rule from a computational fluid dynamics library within the knowledge-based engineering library.

16. A method as set forth in claim 10 wherein the predetermined criteria comprises a tooling feasibility rule from a tooling feasibility library within the knowledge-based engineering library.

17. A method as set forth in claim 10 wherein the predetermined second criteria comprises a human factors analysis rule from a human factors library within the knowledge-based engineering library.

18. A method as set forth in claim 10 wherein the second parameter is a characteristic of a fastener from a fastener library within the knowledge-based engineering library.

19. A method as set forth in claim 10, wherein the method includes the step of comparing the fastener to a database of common fasteners within the fastener library.

20. A method as set forth in claim 10 wherein the second parameter is a feature positioned on a surface of the instrument panel from a feature library within the knowledge-based engineering library.

21. A method as set forth in claim 20 wherein the method includes the step of modifying the feature.

22. A method as set forth in claim 10, wherein the method includes the step of interactively accessing a web-based library through the knowledge-based engineering library.

23. A method of knowledge-based engineering design of an instrument panel for a vehicle, the method comprising the steps of:

selecting a vehicle body model for the vehicle from a knowledge-based engineering library stored in a memory of a computer system;

defining an input parameter for a model of the instrument panel from a knowledge-based engineering library stored in a memory of a computer system;

defining a human factors parameter of the instrument panel from a human factors library within the knowledge-based engineering library;

generating the model of the instrument panel using the input parameter, the human factors parameter and the parametric vehicle body model;

analyzing the model of the instrument panel using a human factors engineering method;

comparing the analysis of the model of the instrument panel to a predetermined human factors criteria from the knowledge-based library; and modifying the human factors parameter so that the model of the instrument panel meets the predetermined human factors criteria.

\* \* \* \* \*